(12) United States Patent
Abedini et al.

(10) Patent No.: US 11,258,575 B2
(45) Date of Patent: Feb. 22, 2022

(54) DUPLEXING MODES BASED ON BEAM CONFIGURATIONS FOR WIRELESS COMMUNICATIONS

(71) Applicant: QUALCOMM Incorporated, San Diego, CA (US)

(72) Inventors: Navid Abedini, Somerset, NJ (US); Sundar Subramanian, San Diego, CA (US); Junyi Li, Chester, NJ (US); Durga Prasad Malladi, San Diego, CA (US); Karl Georg Hampel, Hoboken, NJ (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 16/184,864

(22) Filed: Nov. 8, 2018

(65) Prior Publication Data

US 2019/0140811 A1 May 9, 2019

Related U.S. Application Data

(60) Provisional application No. 62/584,017, filed on Nov. 9, 2017.

(51) Int. Cl.
*H04L 5/14* (2006.01)
*H04B 7/0404* (2017.01)
(Continued)

(52) U.S. Cl.
CPC ......... *H04L 5/1438* (2013.01); *H04B 7/0404* (2013.01); *H04B 7/0408* (2013.01);
(Continued)

(58) Field of Classification Search
CPC . H04L 5/14; H04L 5/1438; H04L 5/16; H04L 5/0005; H04L 5/001; H04B 7/0404;
(Continued)

(56) References Cited

U.S. PATENT DOCUMENTS 7,792,547 B1 * 9/2010 Smith ................. H04W 72/046
455/562.1
9,014,110 B2 4/2015 Montojo et al.
(Continued)

FOREIGN PATENT DOCUMENTS

CN 103516407 A 1/2014
CN 106471745 A 3/2017
(Continued)

OTHER PUBLICATIONS

International Search Report and Written Opinion—PCT/US2018/060062—ISA/EPO—dated Jan. 11, 2019.

*Primary Examiner* — Kevin D Mew
(74) *Attorney, Agent, or Firm* — Holland & Hart LLP

(57) ABSTRACT

Methods, systems, and devices for wireless communications are described. A wireless device may utilize different beam configurations for different signal types, traffic demand, path loss, capabilities of the wireless device or other wireless devices in the system, and the like. The wireless device also may be capable of determining different duplexing modes, which may be utilized in addition to the different beam configurations. The duplexing mode may be based on received measurement reports (e.g., from one or more reference signals) or in some instances, the duplexing mode may be determined by another node (e.g., a core network node, a base station) and transmitted to the wireless device.

30 Claims, 12 Drawing Sheets

(51) Int. Cl.
  *H04L 5/16* (2006.01)
  *H04B 7/06* (2006.01)
  *H04B 7/0408* (2017.01)
  *H04L 5/00* (2006.01)
  *H04W 72/04* (2009.01)
  *H04B 7/0452* (2017.01)

(52) U.S. Cl.
  CPC ......... *H04B 7/0617* (2013.01); *H04B 7/0695* (2013.01); *H04L 5/14* (2013.01); *H04L 5/16* (2013.01); *H04B 7/0452* (2013.01); *H04B 7/0619* (2013.01); *H04L 5/001* (2013.01); *H04L 5/0005* (2013.01); *H04W 72/046* (2013.01)

(58) Field of Classification Search
  CPC .. H04B 7/0408; H04B 7/0452; H04B 7/0617; H04B 7/0619; H04B 7/0695; H04W 72/046
  See application file for complete search history.

(56) References Cited

U.S. PATENT DOCUMENTS

| | | | | |
|---|---|---|---|---|
| 9,577,813 | B2* | 2/2017 | Karjalainen | H04L 5/1438 |
| 9,591,660 | B2* | 3/2017 | Yang | H04L 27/2602 |
| 9,807,776 | B2* | 10/2017 | Zhu | H04L 5/0092 |
| 9,985,773 | B2* | 5/2018 | Damnjanovic | H04L 5/16 |
| 10,028,275 | B2* | 7/2018 | Lyu | H04W 72/0446 |
| 10,405,306 | B2* | 9/2019 | Chen | H04W 72/042 |
| 10,779,198 | B1* | 9/2020 | Oroskar | H04W 36/30 |
| 2011/0286325 | A1* | 11/2011 | Jalali | H04B 7/18589 370/221 |
| 2011/0300914 | A1* | 12/2011 | Gudem | H04B 1/1027 455/574 |
| 2012/0294163 | A1* | 11/2012 | Turtinen | H04W 56/0045 370/252 |
| 2013/0083704 | A1* | 4/2013 | Gaal | H04L 5/001 370/277 |
| 2013/0215844 | A1* | 8/2013 | Seol | H04B 7/0695 370/329 |
| 2013/0301454 | A1* | 11/2013 | Seol | H04B 7/0695 370/252 |
| 2013/0336179 | A1* | 12/2013 | Rubin | H04B 7/0408 370/281 |
| 2014/0044207 | A1* | 2/2014 | Han | H04B 7/0413 375/267 |
| 2014/0086119 | A1* | 3/2014 | Yang | H04L 27/2607 370/280 |
| 2014/0126437 | A1* | 5/2014 | Patil | H04B 7/0689 370/310 |
| 2014/0198773 | A1* | 7/2014 | Yin | H04L 5/001 370/336 |
| 2014/0307654 | A1* | 10/2014 | Kim | H04B 7/0647 370/329 |
| 2014/0307702 | A1* | 10/2014 | Mese | H04B 7/0617 370/330 |
| 2014/0334354 | A1* | 11/2014 | Sartori | H04L 5/0094 370/280 |
| 2015/0009951 | A1* | 1/2015 | Josiam | H04L 5/0051 370/330 |
| 2015/0049650 | A1* | 2/2015 | Choi | H04W 4/70 370/278 |
| 2015/0289246 | A1* | 10/2015 | Suzuki | H04W 76/28 370/329 |
| 2015/0372737 | A1* | 12/2015 | Park | H04L 5/0057 370/329 |
| 2016/0135180 | A1* | 5/2016 | Yuan | H01Q 21/065 370/329 |
| 2016/0183232 | A1* | 6/2016 | Stirling-Gallacher | H04W 72/1226 370/280 |
| 2016/0269087 | A1* | 9/2016 | Subramanian | H04B 7/024 |
| 2016/0345309 | A1* | 11/2016 | Xiong | H04J 11/0053 |
| 2017/0150384 | A1* | 5/2017 | Rune | H04W 72/085 |
| 2017/0238305 | A1* | 8/2017 | Chen | H04L 5/0053 370/311 |
| 2017/0331670 | A1* | 11/2017 | Parkvall | H04J 11/0079 |
| 2018/0007724 | A1* | 1/2018 | Kazmi | H04W 8/005 |
| 2018/0041326 | A1* | 2/2018 | Kazmi | H04W 52/365 |
| 2018/0083679 | A1 | 3/2018 | Lim et al. | |
| 2018/0097607 | A1 | 4/2018 | Ji et al. | |
| 2018/0167832 | A1* | 6/2018 | Fang | H04W 24/08 |
| 2018/0205533 | A1 | 7/2018 | Lee et al. | |
| 2018/0234169 | A1* | 8/2018 | Sridharan | H04L 5/0007 |
| 2018/0351630 | A1* | 12/2018 | Nilsson | H04B 7/0857 |
| 2019/0141744 | A1* | 5/2019 | Naghshvar | H04B 7/0617 |
| 2020/0136710 | A1* | 4/2020 | Takano | H04B 7/0413 |
| 2021/0143887 | A1* | 5/2021 | Oteri | H04B 7/0452 |
| 2021/0194763 | A1* | 6/2021 | Abedini | H04L 41/0654 |
| 2021/0235457 | A1* | 7/2021 | Abedini | H04W 72/0493 |

FOREIGN PATENT DOCUMENTS

| | | |
|---|---|---|
| CN | 106817134 A | 6/2017 |
| GB | 2498559 A | 7/2013 |
| WO | WO-2013012913 A1 | 1/2013 |
| WO | WO-2016153204 A1 | 9/2016 |
| WO | WO-2016159681 A1 | 10/2016 |
| WO | WO-2017007172 A1 | 1/2017 |

* cited by examiner

DUPLEXING MODES BASED ON BEAM CONFIGURATIONS FOR WIRELESS COMMUNICATIONS

CROSS REFERENCES

The present application for patent claims the benefit of U.S. Provisional Patent Application No. 62/584,017 by ABEDINI et al., entitled "DUPLEXING MODES BASED ON BEAM CONFIGURATIONS FOR WIRELESS COMMUNICATIONS," filed Nov. 9, 2017, assigned to the assignee hereof, and expressly incorporated herein.

BACKGROUND

The following relates generally to wireless communication at a wireless device, and more specifically to duplexing modes based on beam configurations for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., a full duplex system), a wireless device utilizing multiple antennas may be capable of transmitting and receiving simultaneously over the same frequency resources. For example, a wireless device may transmit a message over a first antenna and simultaneously receive a message over a second antenna. Such communications, however, may result in self-interference experienced at the wireless device due to, for instance, a transmission at the first antenna being received by the second antenna. In full duplex systems using beamforming, self-interference may be beam specific in that it may degrade communications differently at two or more distinct beams.

SUMMARY

The described techniques relate to improved methods, systems, devices, or apparatuses that support duplexing modes based on beam configurations for wireless communications. Generally, the described techniques provide for the identification and utilization of different beam configurations by a wireless device in wireless communications systems. In some examples, the wireless device may utilize different beam configurations for different signal types, traffic demands, path losses, capabilities of the wireless device or other wireless devices in the system, and the like. The wireless device also may be capable of determining different duplexing modes, which may be utilized in addition to the different beam configurations. A duplexing mode may be based on received measurement reports (e.g., from one or more reference signals) or in some instances, the duplexing mode may be determined by another node (e.g., a core network node, a base station) and transmitted to the wireless device.

A method of wireless communication at a wireless device is described. The method may include identifying a set of beam configurations for a number of communications with at least one target device, determining a duplexing mode for the number of communications based on the identified set of beam configurations, and communicating with the at least one target device based on the identified set of beam configurations and the determined duplexing mode.

An apparatus for wireless communication is described. The apparatus may include means for identifying a set of beam configurations for a number of communications with at least one target device, means for determining a duplexing mode for the number of communications based on the identified set of beam configurations, and means for communicating with the at least one target device based on the identified set of beam configurations and the determined duplexing mode.

Another apparatus for wireless communication is described. The apparatus may include a processor, memory in electronic communication with the processor, and instructions stored in the memory. The instructions may be operable to cause the processor to identify a set of beam configurations for a number of communications with at least one target device, determine a duplexing mode for the number of communications based on the identified set of beam configurations, and communicate with the at least one target device based on the identified set of beam configurations and the determined duplexing mode.

A non-transitory computer-readable medium for wireless communication at a wireless device is described. The non-transitory computer-readable medium may include instructions operable to cause a processor to identify a set of beam configurations for a number of communications with at least one target device, determine a duplexing mode for the number of communications based on the identified set of beam configurations, and communicate with the at least one target device based on the identified set of beam configurations and the determined duplexing mode.

Some examples of the method, apparatus, and non-transitory computer-readable medium described above may further include processes, features, means, or instructions for identifying a signal type or channel type associated with the number of communications, where the set of beam configurations may be identified based on the identified signal type or channel type.

Some examples of the method, apparatus, and non-transitory computer-readable medium described above may further include processes, features, means, or instructions for identifying one or more parameters associated with a capability of the wireless device or with a capability of the at least one target device, where the set of beam configurations may be identified based on the identified one or more parameters.

Some examples of the method, apparatus, and non-transitory computer-readable medium described above may further include processes, features, means, or instructions for identifying a level of traffic demand of the wireless device, the at least one target device, or an additional device, where the set of beam configurations may be identified based on the identified level of traffic demand.

Some examples of the method, apparatus, and non-transitory computer-readable medium described above may further include processes, features, means, or instructions for identifying one or more parameters associated with one or more wireless communication links between the wireless device and the at least one target device, where the set of beam configurations may be identified based on the identified one or more parameters.

In some examples of the method, apparatus, and non-transitory computer-readable medium described above, the one or more parameters include path loss associated with the one or more wireless communication links, directionality associated with the one or more wireless communication links, or a combination thereof.

In some examples of the method, apparatus, and non-transitory computer-readable medium described above, the duplexing mode may be determined based on a level of traffic demand, capabilities associated with one or more devices, limitations associated with one or more devices, received measurement reports of one or more reference signals, or a combination thereof.

In some examples of the method, apparatus, and non-transitory computer-readable medium described above, the one or more reference signals include at least one of a synchronization signal, a beam reference signal, or a combination thereof.

In some examples of the method, apparatus, and non-transitory computer-readable medium described above, determining the duplexing mode includes receiving an indication of the duplexing mode for the plurality of communications.

In some examples of the method, apparatus, and non-transitory computer-readable medium described above, the duplexing mode may be selected by a control node.

In some examples of the method, apparatus, and non-transitory computer-readable medium described above, the control node may be at least one of a central node, a scheduling device of the wireless device, the at least one target device, or any combination thereof.

Some examples of the method, apparatus, and non-transitory computer-readable medium described above may further include processes, features, means, or instructions for receiving a first control channel in a first slot of a subframe according to a first duplexing mode. Some examples of the method, apparatus, and non-transitory computer-readable medium described above may further include processes, features, means, or instructions for transmitting a second control channel in a second slot of the subframe according to the first duplexing mode.

In some examples of the method, apparatus, and non-transitory computer-readable medium described above, the first duplexing mode may be a half-duplex mode.

Some examples of the method, apparatus, and non-transitory computer-readable medium described above may further include processes, features, means, or instructions for communicating one or more data channels in a third slot of the subframe according to a second duplexing mode different from the first duplexing mode.

In some examples of the method, apparatus, and non-transitory computer-readable medium described above, the second duplexing mode may be a full duplex mode.

Some examples of the method, apparatus, and non-transitory computer-readable medium described above may further include processes, features, means, or instructions for including a time gap between the first control channel, the second control channel, the one or more data channels, or a combination thereof.

Some examples of the method, apparatus, and non-transitory computer-readable medium described above may further include processes, features, means, or instructions for communicating a first scheduling message to the at least one target device in a first portion of a control block of a slot. Some examples of the method, apparatus, and non-transitory computer-readable medium described above may further include processes, features, means, or instructions for communicating a second scheduling message to the at least one target device in a second portion of the control block of the slot.

In some examples of the method, apparatus, and non-transitory computer-readable medium described above, the first scheduling message indicates a data channel transmission for the at least one target device. In some examples of the method, apparatus, and non-transitory computer-readable medium described above, the second scheduling message indicates a data channel reception for the at least one target device.

In some examples of the method, apparatus, and non-transitory computer-readable medium described above, the control block may be multiplexed according to a time division multiplexing (TDM) scheme, a frequency division multiplexing (FDM) scheme, a code division multiplexing (CDM) scheme, a spatial division multiplexing (SDM) scheme, or a combination thereof.

In some examples of the method, apparatus, and non-transitory computer-readable medium described above, the first scheduling message or the second scheduling message may be based on a traffic demand for one or more nodes, a capability of the at least one target device, a signal type associated with the first scheduling message or the second scheduling message, an indication from one or more scheduling nodes, or a combination thereof.

In some examples of the method, apparatus, and non-transitory computer-readable medium described above, the duplexing mode includes at least one of a full duplex mode, half-duplex mode, single user (SU) multiple input multiple output (MIMO) (SU-MIMO) mode, multiple user (MU) MIMO mode, or a combination thereof.

A method of wireless communication at a wireless device is also described. The method may include identifying a signal type or channel type for a number of communications with at least one target device, determining a duplexing mode for the number of communications based on the identified signal type or channel type, and communicating with the at least one target device based at least in part on the determined duplexing mode.

An apparatus for wireless communication is also described. The apparatus may include a processor, memory in electronic communication with the processor, and instructions stored in the memory. The instructions may be operable to cause the processor to identify a signal type or channel type for a number of communications with at least one target device, determine a duplexing mode for the number of communications based on the identified signal type or channel type, and communicate with the at least one target device based at least in part on the determined duplexing mode.

Another apparatus for wireless communication is also described. The apparatus may include means for identifying a signal type or channel type for a number of communications with at least one target device, means for determining a duplexing mode for the number of communications based on the identified signal type or channel type, and means for communicating with the at least one target device based at least in part on the determined duplexing mode.

A non-transitory computer-readable medium for wireless communication at a wireless device is described. The non-transitory computer-readable medium may include instructions operable to cause a processor to identify a signal type or channel type for a number of communications with at least one target device, determine a duplexing mode for the number of communications based on the identified signal type or channel type, and communicate with the at least one target device based at least in part on the determined duplexing mode.

Some examples of the method, apparatus, and non-transitory computer-readable medium described above may further include processes, features, means, or instructions for identifying a set of beam configurations associated with the number of communications based at least in part on the identified signal type or channel type.

Some examples of the method, apparatus, and non-transitory computer-readable medium described above may further include processes, features, means, or instructions for identifying one or more parameters associated with a capability of the wireless device or with a capability of the at least one target device, where the signal type or channel type is identified based on the identified one or more parameters.

Some examples of the method, apparatus, and non-transitory computer-readable medium described above may further include processes, features, means, or instructions for identifying a level of traffic demand of the wireless device, the at least one target device, or an additional device, wherein the signal type or channel type is identified based on the identified level of traffic demand.

Some examples of the method, apparatus, and non-transitory computer-readable medium described above may further include processes, features, means, or instructions for identifying one or more parameters associated with one or more wireless communication links between the wireless device and the at least one target device, where the signal type or channel type is identified based on the identified one or more parameters.

DETAILED DESCRIPTION

Figure 1:
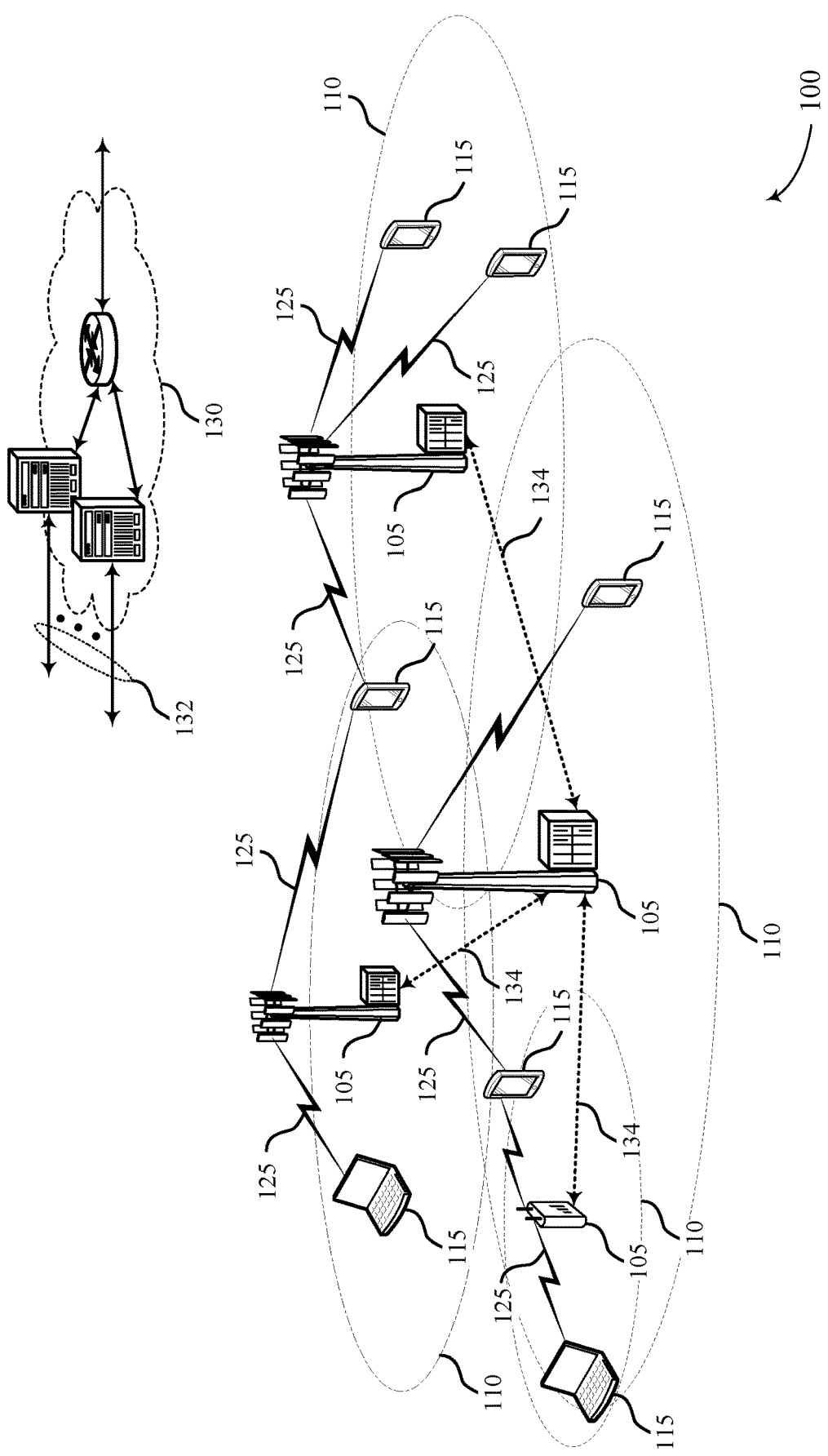
FIG. 1 illustrates an example of a wireless communications system that supports duplexing modes based on beam configurations for wireless communications in accordance with aspects of the present disclosure.

In a full duplex mode, a wireless device may transmit and receive communications simultaneously. However, the receiving antenna at the wireless device may experience self-interference from the transmitting antenna (e.g., the signals transmitted by the transmitting antenna may interfere with the signals sent to the wireless device from another wireless device in the wireless communication system). Depending on the level of the self-interference, the use of full duplex mode may impair the ability of the wireless device to receive communications from other wireless devices.

In some cases, the level of the self-interference may depend on the type of beam configuration used for communications. If the directionality of the received beam and the transmitted beam spatially overlap, then the level of self-interference experienced in the system may be greater. Further, if the beam widths of the transmitted beam and the received beams are wide, then the system may also experience increased self-interference levels (e.g., compared to beams having narrower beam widths).

Accordingly, a wireless device may identify a set of beam configurations for scheduled communications to be transmitted and/or received. The identification may be based on the types of channels and/or signals to be transmitted and/or received, the capabilities of the wireless device, the capabilities of the target wireless device, the traffic demand experienced at either the wireless device or the target wireless device, or a parameter associated with a communication link status between the wireless device and the target wireless device.

Based on the identified beam configurations or identified signal type of channel type, the wireless device may determine a duplexing mode for the scheduled communications. In addition, the wireless device may determine a duplexing mode for the scheduled communications based on an identified signal or channel type. The duplex mode may be a full duplex mode when the transmitted signal and the received signal have limited interference with each other such that reception of either signal is impaired. The duplex mode may be a half-duplex mode when operation in full duplex mode may impair reception of at least one of the signals.

The wireless device may then transmit and/or receive communications in accordance with the identified beam configurations and the selected duplex mode. For example, the wireless device may simultaneously transmit and receive communications when a duplex mode is selected. In contrast, the wireless device may either transmit or receive, but not both, when a half-duplex mode is selected.

Aspects of the disclosure are initially described in the context of a wireless communications system. Further, aspects are described with respect to beamforming configurations, a communication configuration, a scheduling configuration, and process flows. Additional aspects of the disclosure are illustrated by and described with reference to apparatus diagrams, system diagrams, and flowcharts that relate to duplexing modes based on beam configurations for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105). Wireless communications system 100 may also support Integrated Access/Backhaul (IAB) techniques, which may share resources between access traffic and backhaul traffic. In some cases, the framework for IAB framework may be similar to the framework for access network techniques such that each backhaul node in IAB may support UE functionality (e.g., acting as a UE) and access node functionality (e.g., acting as a gNB). In some cases, a backhaul node may be connected with multiple other nodes (e.g., to enhance robustness of the wireless communications system 100).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers (CCs) and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 (e.g., an NR system) may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a wireless device such as a base station 105 or a UE 115 may experience self-interference during transmission at a first antenna and reception at a second antenna (e.g., when operating in a full duplex mode). When utilizing beamforming, the wireless device may experience different levels of self-interference at different transmit beams or receive beams, and may utilize different beam configurations for transmission and reception with another wireless device. In such instances, the beam configurations may depend on the type of signal (e.g., control or data) being communicated, the capabilities of the wireless devices, or other factors. Further, the wireless device may determine one or more duplexing modes to use for different beams or at different times in addition to or as an alternative to the beam configurations. Such techniques may help reduce self-interference experienced at the wireless device, which may result in more efficient communication.

Figure 2:
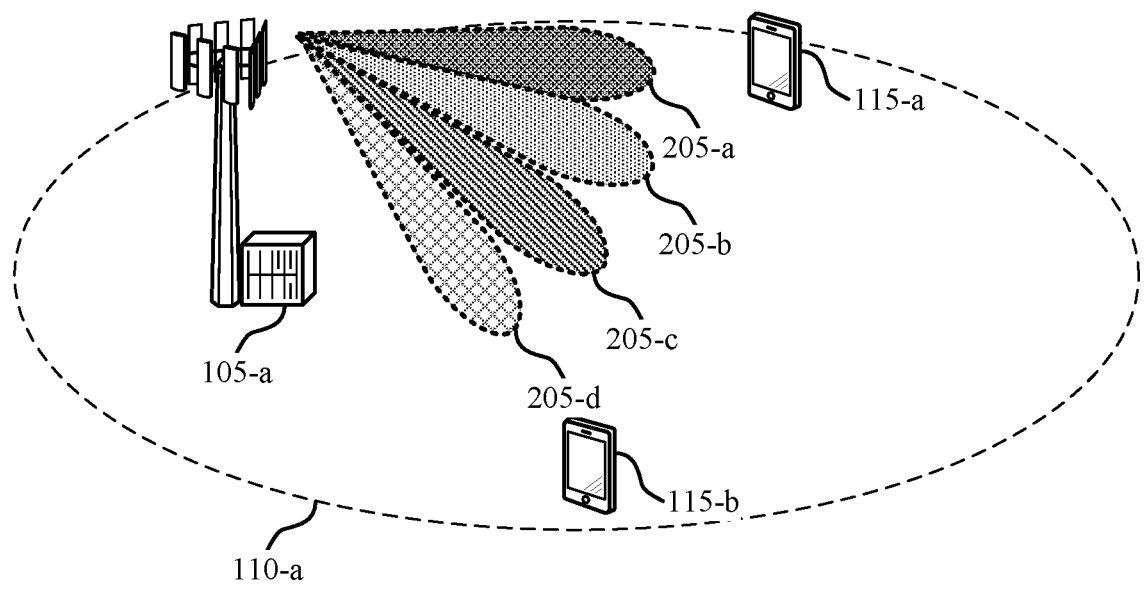
FIG. 2 illustrates an example of a wireless communications system that supports duplexing modes based on beam configurations for wireless communications in accordance with aspects of the present disclosure.

FIG. 2 illustrates an example of a wireless communications system 200 that supports duplexing modes based on beam configurations for wireless communications in accordance with various aspects of the present disclosure. In some examples, wireless communications system 200 may implement aspects of wireless communications system 100 as described with reference to FIG. 1. The wireless communication system 200 may include a base station 105-a. In some examples, the base station 105-a may be an example of aspects of a base station 105 as described with reference to FIG. 1. The base station may include a geographic coverage area 110-a which may be an example of the geographic coverage area 110 described with reference to FIG. 1.

The base station 105-a may support beamforming techniques for wireless communications, which may allow the base station 105-a to transmit and/or receive communications over one or more beams 205-a through 205-d. The beamforming techniques may utilize one or more antenna arrays included in the base station 105-a, where at least one antenna array is used to transmit communications (e.g., via beams 205-a through 205-d) and at least one other antenna array is used to receive communications (e.g., via beams 205-a through 205-d). The base station 105-a may target one or more of UE 115-a and UE 115-b (or another base station 105-a, for example) to exchange communications. UEs 115-a and UE 115-b may be examples of aspects of UE 115 as described with reference to FIG. 1.

In a full duplex system, a wireless device, which may be a base station 105-a, UE 115-a, UE 115-b, or a device which has the capabilities of both a base station 105 and a UE 115, may be able to transmit and receive simultaneously over the same frequency resources, for example, transmitting communications over at least one transmitting antenna and receiving communications over at least one receiving antenna. In some full duplex communications, self-interference may occur between the received communications and the transmitted communications, which may degrade the transmissions received at the receiving antennas. Estimating the level of self-interference and compensating for the estimated self-interference (e.g., canceling) may enhance communications in full duplex, and may further control self-interference. Further, self-interference cancelation may occur at different stages of the receiver chain. For example, self-interference cancelation may occur at the transmitting or receiving antenna, in the analog domain stage, or at the digital domain stage. A successful self-interference cancelation and full duplex operation may utilize these methods and may achieve a self-interference cancelation at a level of 90–100 dB (or more).

The directionality of the beams may impact the self-interference levels experienced in a full duplex system. Beamforming (e.g., digital and/or analog beamforming), for transmitted and received communications may occur in a mmW system. In the example of a mmW system that is also full duplex capable, the level of self-interference may be beam-specific. For instance, the system may support full duplex where the transmit beam and the receive beam have more spatial separation between each other (e.g., the transmit beam and the receive beam do not overlap), and thus may experience minimal self-interference levels. In a case where the receive and transmit beams partially or fully overlap spatially, full duplex communications may degrade to an extent such that reception of the receive beam may not be feasible (e.g., decoding the received communication may be unsuccessful) due to a high self-interference level.

The width of the beams in a full duplex system may also impact the self-interference levels in the system. For example, wider beams may have larger interference than narrower beams. However, narrow beams may exhibit more concentrated power and thus the peak interference in the region of overlap between narrow beams may be more severe than the peak interference between wide beams.

A mmW device such as base station 105-a, UE 115-a, or UE 115-b may use different beam configurations (e.g., beam-width, number of beams, beam resources, beam gain, etc.) depending on the type of communications with one or multiple other wireless nodes. The choice of beam configuration may depend on the type of communications or channels scheduled for transmission or reception. For example, some channel types may not require a high link budget (e.g., a communication link performance, such as signal-to-interference-plus-noise ratio ((SINR)), such as channels transmitted using a low MCS, such as a physical downlink control channel (PDCCH) or a physical uplink control channel (PUCCH). These channels may be transmitted using wider beams and without utilizing beamforming gains.

Further, a wireless device (e.g., base station 105-a, UE 115-a, or UE 115-b) may communicate some signals with wider beams to provide a larger angular coverage (e.g., a control channel, a reference signal (beam or sync), a broadcast channel (PBCH, RMSI)) to cover multiple target nodes and/or to simplify the beamform (e.g., simplified beam searching techniques, simplified beam steering, and/or simplified beam determination procedures) of the device or the target node(s).

A wireless device may also use different beam configurations based on the state of the wireless device or target node. For example, the beam configuration may be based on the capabilities of the wireless device or target node (e.g., analog/digital processing capabilities, beamforming capabilities, number of antennas, number of digital chains, beam-correspondence capability). The beam configuration may additionally or alternatively be based on a location or relative location of the wireless device or the target node (e.g., angular direction or distance, which may correspond to path loss). In some examples, the wireless device and/or the target node may have different capabilities for the receiving mode and the transmitting mode. Accordingly, the wireless device may determine to communicate using full duplex or half-duplex methods based on the factors described above.

Full duplexing may be dependent upon whether a control channel or a data channel is scheduled for transmission or reception. In some cases, a control channel may be configured for less link budget (LB), and thus may be transmitted using a wide beam. In other cases, a data channel may be configured for more LB, and thus may be transmitted using a narrow beam which may allow for higher beamforming gain. In some cases, full duplexing may not support the transmission of a control channel concurrently with the reception of another signal or channel (e.g., another control channel) at the same time and frequency, or vice-versa. Therefore, a control channel may not support a full duplexing mode due to the high self-interference levels the system may experience. In other cases, full duplexing may support transmission of a data channel concurrently with the reception of another signal or channel (e.g., another data channel) at the same time and frequency, or vice versa. Therefore, a full duplexing mode may support data channel transmission/reception.

In some examples, wireless communications system 200 may be configured for a half-duplexed control channel and a full duplexed data channel. A communications system supporting a half-duplex mode allows for communications to be transmitted and received over the same frequency resources, but in different time resources (e.g., transmission and reception may not be simultaneous). In some cases, the same target node or different target nodes may transmit or receive different channels.

Additionally or alternatively, a time gap may be included between different communications. For example, there may be a time gap between the control channels communicated in a half-duplex mode and the data channels communicated in a full duplex mode.

The wireless device (e.g., base station 105-a, UE 115-a, UE 115-b) may have two antenna arrays and may use one antenna array for transmitting signals and the other antenna array for receiving signals. Alternatively, the wireless device may use both antenna arrays for transmission or both antenna arrays for reception to increase overall transmission/reception capacity. For example, the wireless device may implement a multiple-user multiple-input multiple-output (MU-MIMO) mode which may allow for serving multiple UEs (UEs 115-a, 115-b, etc.) simultaneously. In another example, the wireless device may implement a single-user multiple-input multiple-output (SU-MIMO) mode which may serve a single UE (UEs 115-a, 115-b, etc.) with an increased data rate (e.g., via spatial diversity).

The wireless device (e.g., base station 105-a, UE 115-a, UE 115-b) may determine a transmission/reception configuration based on one or more factors. The wireless device, in a given slot, may determine to schedule multiple communications using a full duplex mode, MU-MIMO transmission, SU-MIMO transmission, MU-MIMO reception, or SU-MIMO reception. The wireless device may base this determination on any combination of the demand for one or multiple other target nodes, the state or capability of the target nodes, whether the wireless device can support full duplex based on the corresponding beam configurations, and the type of signals or channels to be scheduled for transmission or reception. The wireless device may further indicate the determined schedule through one or multiple control channel transmissions.

In some cases, some of these communications may be directed towards a set of scheduled target wireless devices (UE 115-a, UE 115-b, etc.) while other communications may be directed towards another set of scheduling target wireless devices (e.g., base station 105-a). The determination of the schedule may be based on a scheduling indication from another scheduling target wireless device, an indication from a central node, or from coordinated or local scheduling via signaling among multiple scheduling target wireless devices.

Additionally, a wireless device may schedule different multiplexing modes in each slot, where the slot may be an example of a time unit such as a subframe, a mini-slot, a symbol, etc. In some cases, each slot may include one or multiple control regions with different multiplexing methods than implemented in the data region. Additionally or alternatively, each slot may contain one or multiple gap intervals, which may be required for transmission, reception, or beam switching.

Figure 3A:
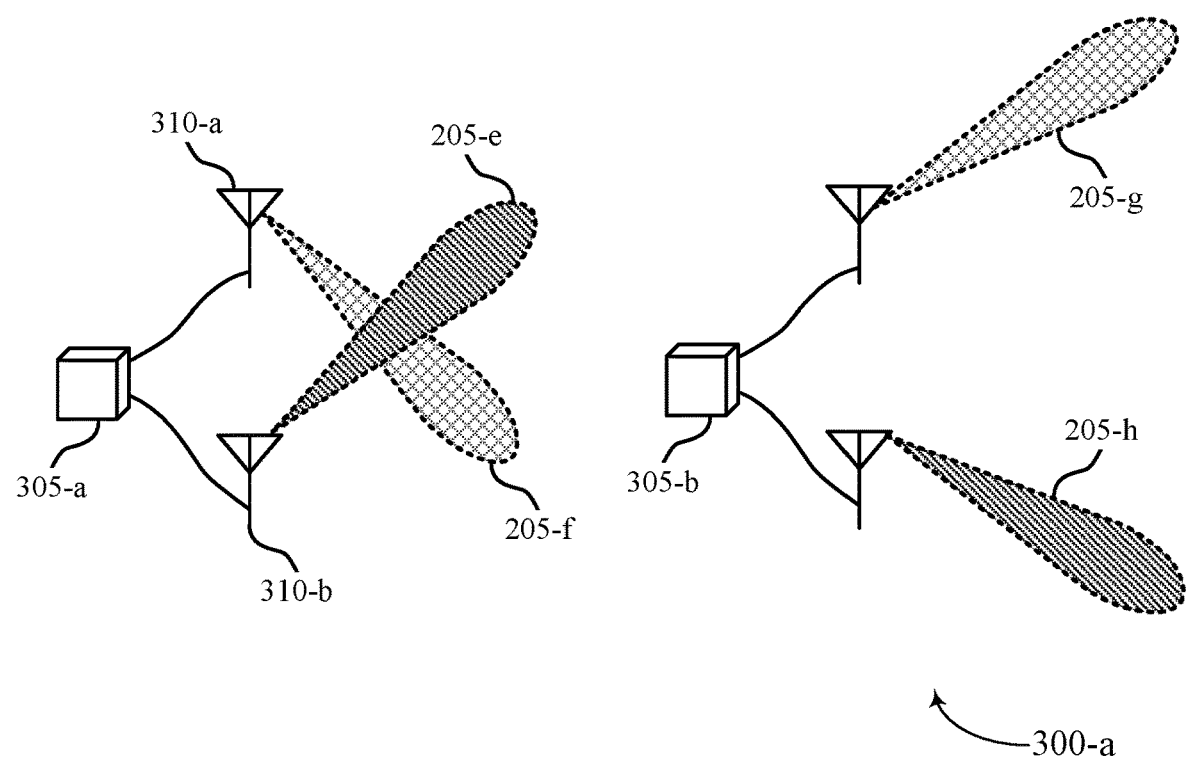
FIGS. 3A and 3B illustrate example beamforming configurations that support duplexing modes based on beam configurations for wireless communications in accordance with aspects of the present disclosure.
Figure 3B:
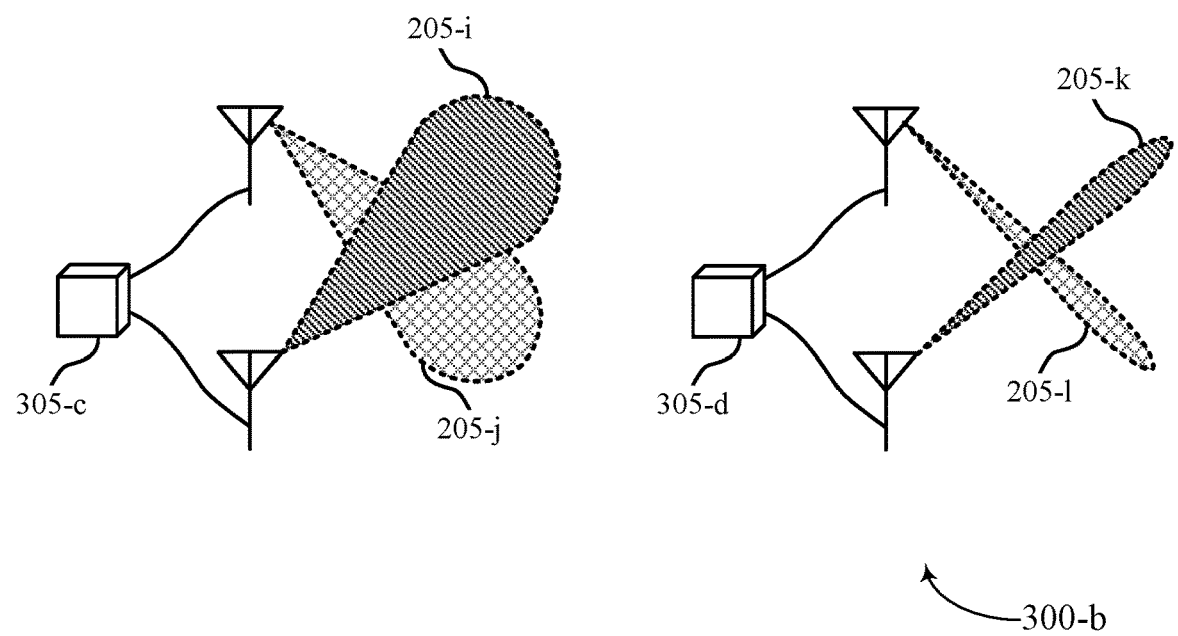

FIGS. 3A and 3B illustrate example beamforming configurations 300 that support duplexing modes based on beam configurations for wireless communications in accordance with various aspects of the present disclosure. In some examples, beam configurations 300-a and 300-b may implement aspects of wireless communications systems 100 or 200 as described with reference to FIGS. 1 and 2.

FIG. 3A illustrates beamforming configurations 300-a in accordance with aspects of the present disclosure. Wireless device 305-a may be a UE 115, a base station 105, or wireless device 305-a may have the capabilities of both a UE 115 and base station 105. Wireless device 305-a may have a plurality of antennas, where the plurality of antennas may be configured into a first antenna array 310-a and a second antenna array 310-b. A full duplex mode may use one antenna array (e.g., the first antenna array 310-a) as a receiving antenna array configured as receive beam 205-f, whereas the full duplex mode may use the other antenna array (e.g., the second antenna array 310-b) configured as transmit beam 205-e. As the wireless device 305-a may implement a full duplex mode, beam 205-e may utilize, at least partially, the same frequency or time resources utilized by beam 205-f. The directionality of the beams may impact the self-interference levels experienced in a full duplex system. More specifically, the full duplex system may experience self-interference if beams 205-e and 205-f at least partially overlap spatially. In cases where the receive and transmit beams partially or fully overlap spatially, full duplex communications may degrade to an extent where reception of the receive beam may not be feasible (e.g., decoding the received communication from beam 205-f may be unsuccessful) due to a high self-interference level.

In another example, wireless device 305-b may experience minimal self-interference levels based on a transmit beam 205-g and receive beam 205-h. In this example, beams 205-g and 205-h may not overlap spatially with one another. Therefore, full duplex communications for wireless device 305-b may experience minimal self-interference levels, and the receive beam 205-h may be minimally degraded due to the transmitted beam 205-g.

FIG. 3B illustrates beamforming configurations 300-b in accordance with the present disclosure. The width of the beams used by wireless device 305 may also impact the self-interference levels experienced by a wireless device 305 in a full duplex mode. For example, wider beams may have larger self-interference levels than narrower beams. A wireless device 305-c may utilize transmit beam 205-i and receive beam 205-j in a full duplex mode, where the beams 205-i and 205-j may at least partially overlap spatially. Wireless device 305 may transmit and/or receive beams 205-i and 205-j using larger beam widths, which may be due to various factors discussed in FIG. 2. Due to the larger beam widths of beams 205-i and 205-j, the wireless device 305-c may experience high self-interference levels, and the communications received in the beam 205-j may degrade to the point where received communications may be unsuccessfully decoded.

In another example, a wireless device 305-d may experience minimal self-interference levels based on a transmit beam 205-k and a receive beam 205-l. In this example, while beams 205-k and 205-l may partially overlap spatially, the narrow beam width of the beams 205-k and 205-l may cause the wireless device 305-d to experience less self-interference levels as compared to device 305-c. Additionally, the power of narrow beams may be more concentrated and thus the peak interference in the region of overlap between beams 205-k and 205-l may be more severe than the peak interference between wider beams (e.g., beams 205-i and 205-j).

Figure 4:
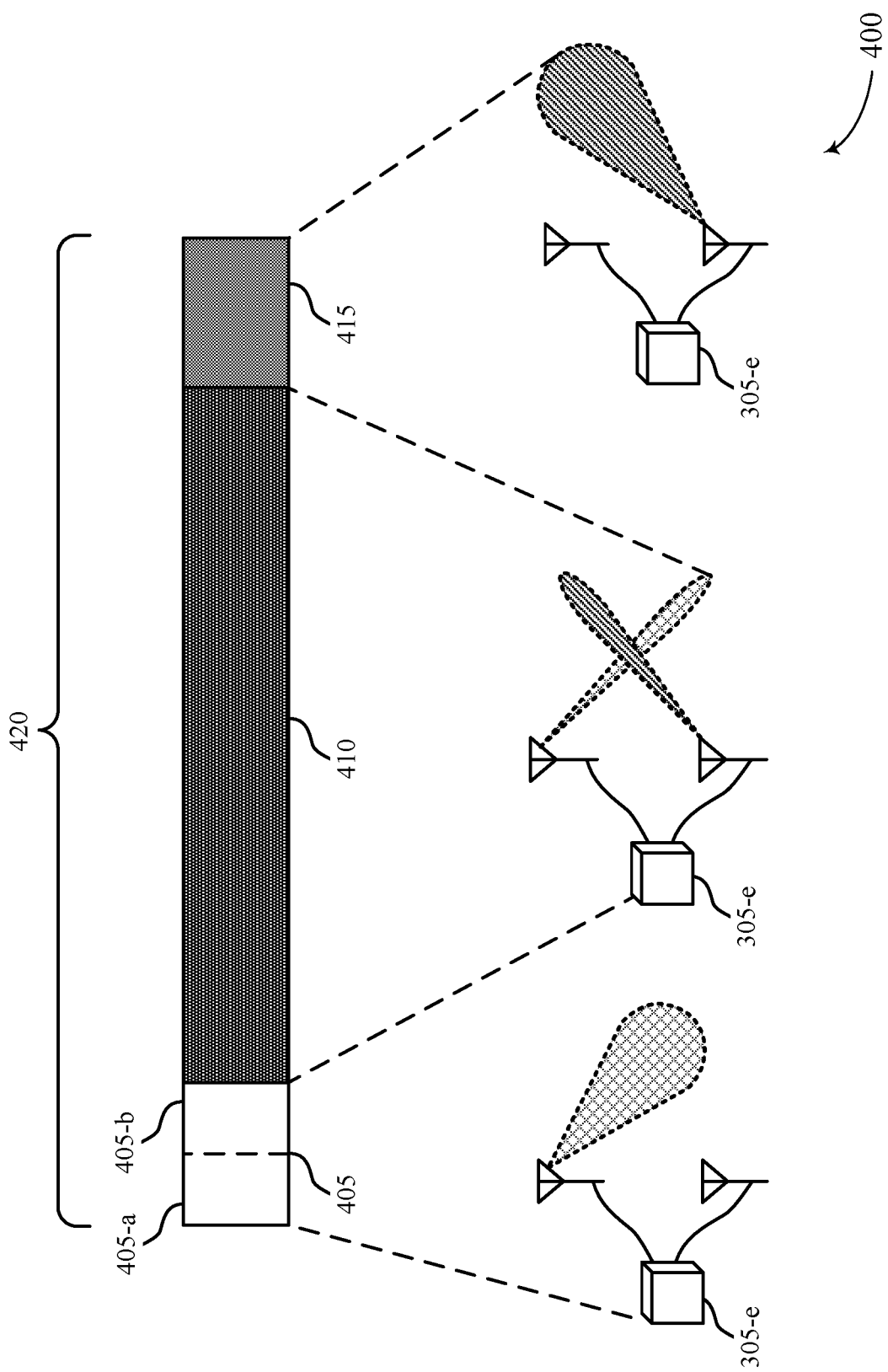
FIG. 4 illustrates an example of a communication configuration that supports duplexing modes based on beam configurations for wireless communications in accordance with aspects of the present disclosure.

FIG. 4 illustrates an example of a communication configuration 400 that supports duplexing modes based on beam configurations for wireless communications in accordance with various aspects of the present disclosure. In some examples, communication configuration 400 may implement aspects of wireless communications systems 100 or 200 as described with reference to FIGS. 1 and 2.

In some examples, communication configuration 400 may contain a half-duplexed control channel and a full duplexed data channel. For example, a wireless device 305-e may schedule communications for reception or transmission over a portion of a time interval 420. In the first portion of the time interval, the wireless device 305-e may schedule for a half-duplex interval 405, which wireless device 305-e may use to transmit half-duplex communications, such as those carried over a control channel (e.g., PUCCH, PDCCH). During the half-duplex interval 405, the wireless device 305-e may only perform a transmission and may not receive any communications, which may reduce the existence of self-interference levels the wireless device 305-e may experience. The wireless device 305-e may thus transmit a communication configured to use a wide beam width, such as a control channel. In some cases, the wireless device 305-e may transmit multiple communications from the transmitting antenna during the half-duplex interval 405, such as multiple control channels or communications supporting MIMO.

After the half-duplex interval 405, the wireless device 305-e may schedule a full duplex interval 410, which the wireless device 305-e may use to transmit and receive full duplex communications, such as those carried over data channels. During the full duplex interval 410, the wireless device 305-e may both transmit and receive communications. During the full duplex interval 410, the wireless device 305-e may transmit and receive communications which may reduce self-interference levels even if there is spatial overlap between the transmitted and received communications, such as those with narrow beam widths (e.g., data communications).

After the full duplex interval 410, the wireless device 305-e may schedule for another half-duplex interval 415, the wireless device 305-e may use to receive half-duplex communications, such as those carried over a control channel (e.g., PUCCH, PDCCH). During the half-duplex interval 415, the wireless device 305-e may only receive and may not transmit any communications, which may reduce the existence of self-interference levels experienced by the wireless device 305-e. The wireless device 305-e may thus receive a communication that may require a wide beam width, such as a control channel. In some cases, the wireless device 305-e may receive multiple communications at the receiving antenna array during the half-duplex interval 415, such as multiple downlink control channels or communications supporting MIMO.

Additionally or alternatively, a time gap may be included between different communications. For example, there may be a time gap between the control channel communicated during the half-duplex interval 405 and the data channels communicated during the full duplex interval 410.

In some cases, a wireless device 305-e may transmit a control channel that may include multiple parts (e.g., a first control channel 405-a and a second control channel 405-b, each of which may be used for scheduling) in the half-duplex interval 405. For example, the first control channel 405-a may schedule a first data channel for the wireless device 305-e to transmit (e.g., a downlink channel). The wireless device 305-e may transmit the first channel in full duplex interval 410. The second control channel 405-b may schedule a wireless device 305-e to receive a second data channel (e.g., an uplink data channel). The wireless device 305-e may further receive the second channel in full duplex interval 410. In some cases, the control channels 405-a and 405-b may be multiplexed (e.g., via time division multiplexing (TDM), frequency division multiplexing (FDM), code division multiplexing (CDM), spatial division multiplexing (SDM)). Additionally or alternatively, the wireless device 305-e may transmit the two control channels in two different slots or time units such as mini-slots, subframes, etc.

Figure 5:
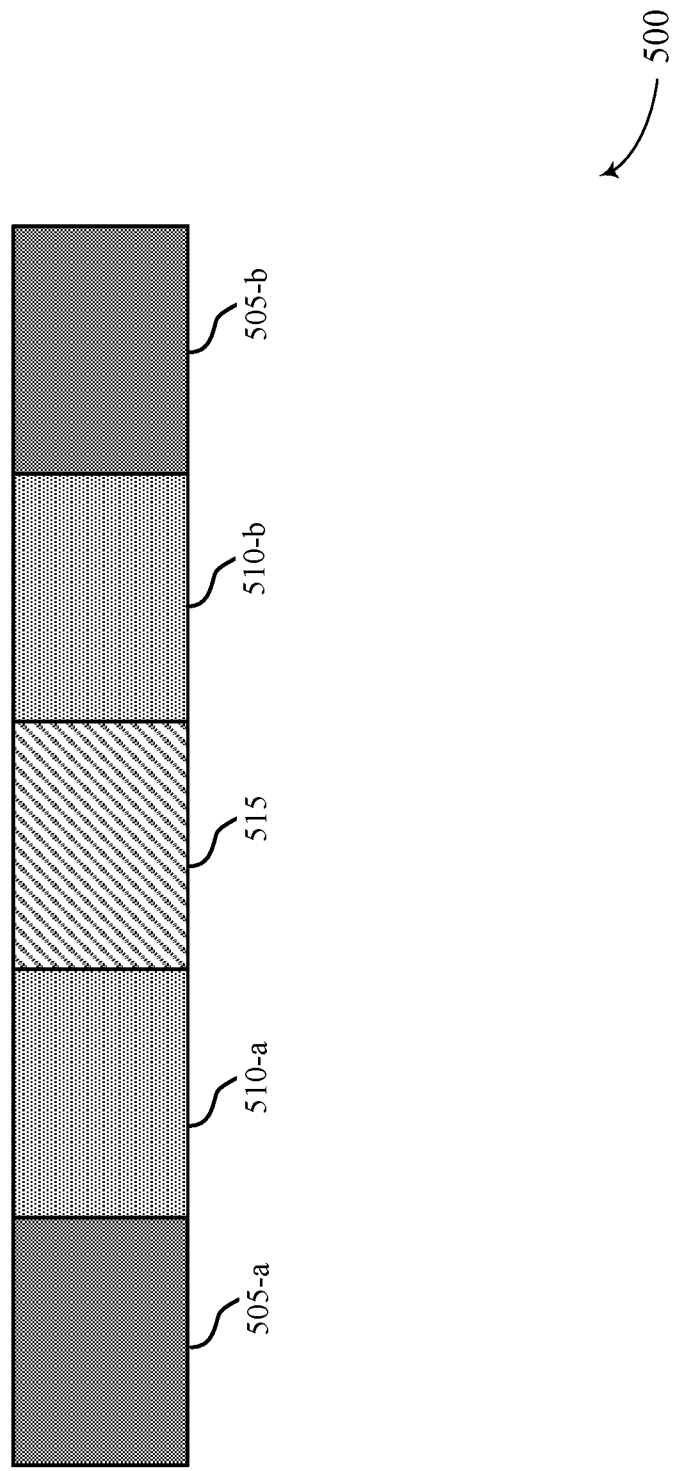
FIG. 5 illustrates an example of a scheduling configuration that supports duplexing modes based on beam configurations for wireless communications in accordance with aspects of the present disclosure.

FIG. 5 illustrates an example of a scheduling configuration 500 that supports duplexing modes based on beam configurations for wireless communications in accordance with various aspects of the present disclosure. In some examples, scheduling configuration 500 may implement aspects of wireless communications systems 100 or 200 as described with reference to FIGS. 1 and 2. For example, a wireless device 305 (as described with reference to FIGS. 3 and 4) may utilize the scheduling configuration 500.

The wireless device 305 may schedule different beam configurations to take advantage of the benefits of the various available beam configurations. For example, the wireless device 305 may schedule for full duplex communications during the first interval 505-a. For instance, the wireless device 305 may transmit and receive communications utilizing a full duplex mode during the first interval 505-a, where one antenna array may be used to transmit communications and another antenna array may be used to receive communications. In the second interval 510-a, the wireless device 305 may schedule to transmit MIMO (e.g., SU-MIMO or MU-MIMO) communications, and may utilize a number (e.g., both) of the antenna arrays to transmit communications across various spatial streams. In the third interval 515, the wireless device 305 may schedule to receive MIMO (e.g., SU-MIMO or MU-MIMO) communications, and may utilize a number (e.g., both) of the antenna arrays to receive communications across various spatial streams. In the fourth interval 510-b, the wireless device 305 may schedule to transmit MIMO (e.g., SU-MIMO or MU-MIMO) communications and may schedule full duplex communications during the fifth interval 505-*b*, where the wireless device 305 may transmit and receive communications utilizing a full duplex mode during the first interval 505-*b*. Other scheduling configurations may be considered without departing from the scope of the present disclosure.

Figure 6:
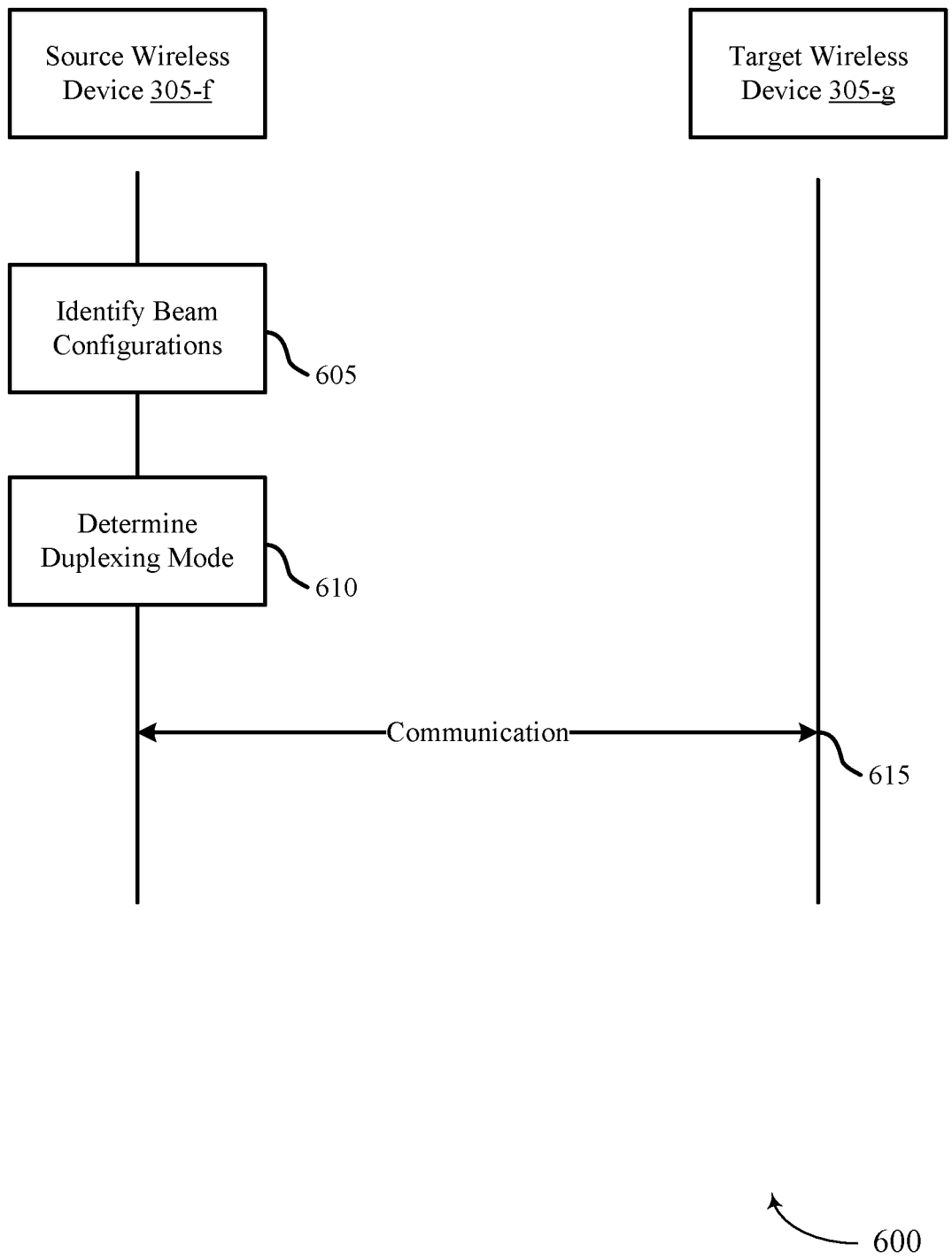
FIG. 6 illustrates an example of a process flow that supports duplexing modes based on beam configurations for wireless communications in accordance with aspects of the present disclosure.

FIG. 6 illustrates an example of a process flow 600 that supports duplexing modes based on beam configurations for wireless communications in accordance with various aspects of the present disclosure. In some examples, a wireless communications system such as wireless communications systems 100 or 200 as described with reference to FIGS. 1 and 2 may implement aspects of process flow 600. Process flow 600 illustrates techniques performed by a source wireless device 305-*f* and a target wireless device 305-*g*, each of which may be an example of wireless device 305 described above with reference to FIGS. 3-5 or a base station 105 or a UE 115 as described with reference to FIGS. 1 and 2.

At 605, the source wireless device 305-*f* may identify a set of beam configurations for a number of communications with at least one target device, such as target device 305-*g*. In some cases, the source wireless device 305-*f* may identify a signal type or channel type associated with the number of communications and identify the set of beam configurations based on the identified signal type or channel type. In some examples, the source wireless device 305-*f* or the target wireless device 305-*g* may use a capability to identify the set of beam configurations. In some aspects, the source wireless device 305-*f* may identify a level of traffic demand of the source wireless device 305-*f*, the at least one target device 305-*g*, or an additional device and may further identify the set of beam configurations based on the level of traffic demand. In some instances, one or more parameters associated with one or more wireless communication links between the source wireless device 305-*f* and the target wireless device 305-*g* may be used to identify the set of beam configurations.

At 610, the source wireless device 305-*f* may determine a duplexing mode for the number of communications based on the identified set of beam configurations. In some cases, the duplexing mode is determined based on a level of traffic demand, capabilities associated with one or more devices, limitations associated with one or more devices, received measurement reports of one or more reference signals, or a combination thereof. In some cases, the source wireless device 305-*f* may determine the duplexing mode by receiving (e.g., from a network node such as a core network node or a base station) an indication of the duplexing mode for the number of communications.

At 615, the source wireless device 305-*f* may communicate with the target wireless device 305-*g* based on the identified set of beam configurations and the determined duplexing mode. In some cases, communicating with the target wireless device 305-*g* may include transmitting a control channel (e.g., a downlink control channel) in a first set of time resources of a TTI using a first duplexing mode (e.g., a half-duplex mode), receiving a different control channel (e.g., an uplink control channel) in a second set of time resources of the TTI using the first duplexing mode. In some examples, communicating with the target wireless device 305-*g* may include transmitting a first scheduling message to the target wireless device 305-*g* in a first portion of a control block of a TTI and transmitting a second scheduling message to the target wireless device 305-*g* in a second portion of the control block of the TTI.

Figure 7:
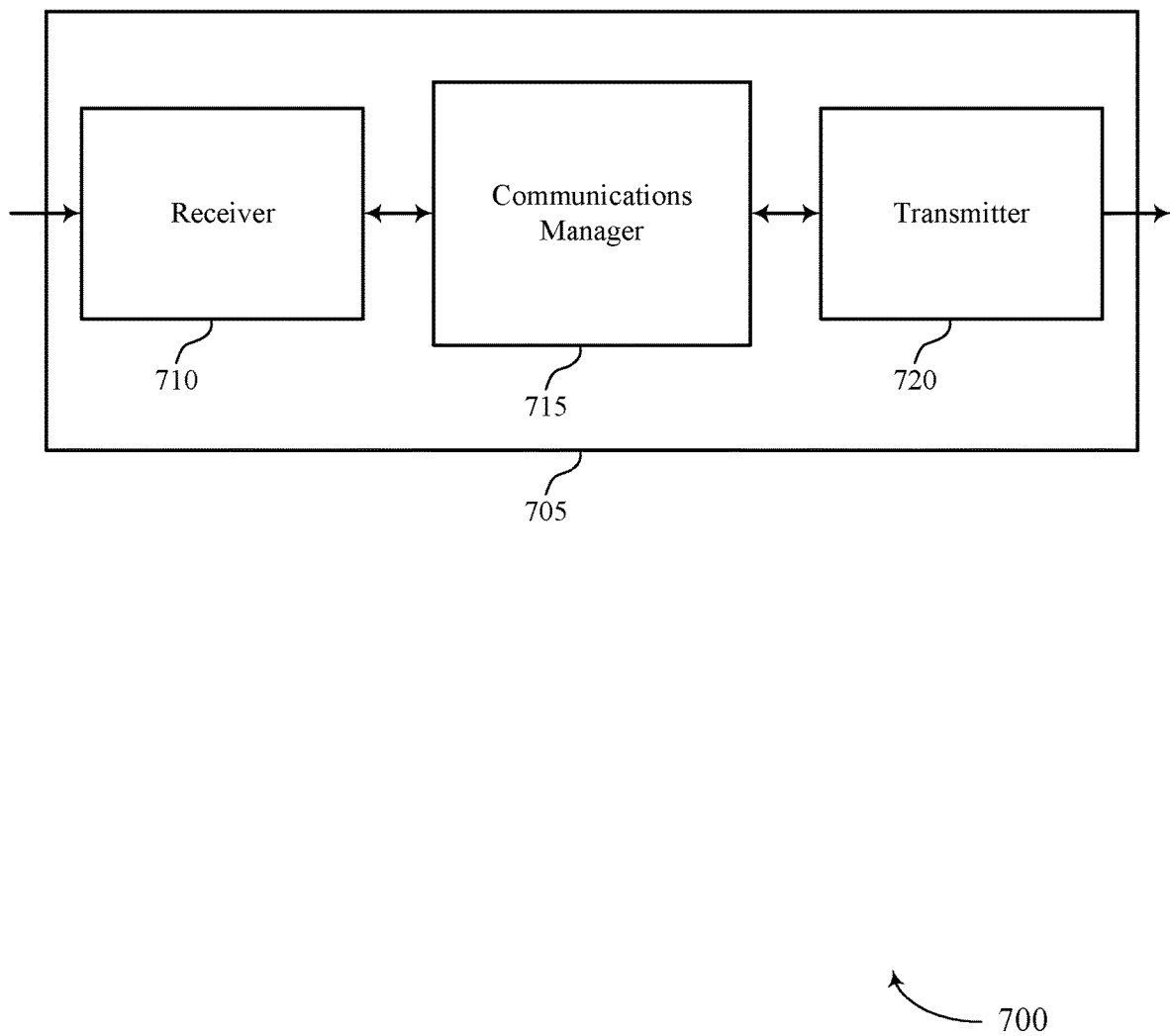
FIGS. 7 through 9 show block diagrams of a device that supports duplexing modes based on beam configurations for wireless communications in accordance with aspects of the present disclosure.

FIG. 7 shows a block diagram 700 of a wireless device 705 that supports duplexing modes based on beam configurations for wireless communications in accordance with aspects of the present disclosure. Wireless device 705 may be an example of aspects of a UE 115 or base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to duplexing modes based on beam configurations for wireless communications, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify a set of beam configurations for a set of communications with at least one target device, determine a duplexing mode for the set of communications based on the identified set of beam configurations, and communicate with the at least one target device based on the identified set of beam configurations and the determined duplexing mode.

Communications manager 715 may identify a signal type or channel type for a set of communications with at least one target device, determine a duplexing mode for the set of communications based on the identified signal type or channel type, and communicate with the at least one target device based on the determined duplexing mode.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
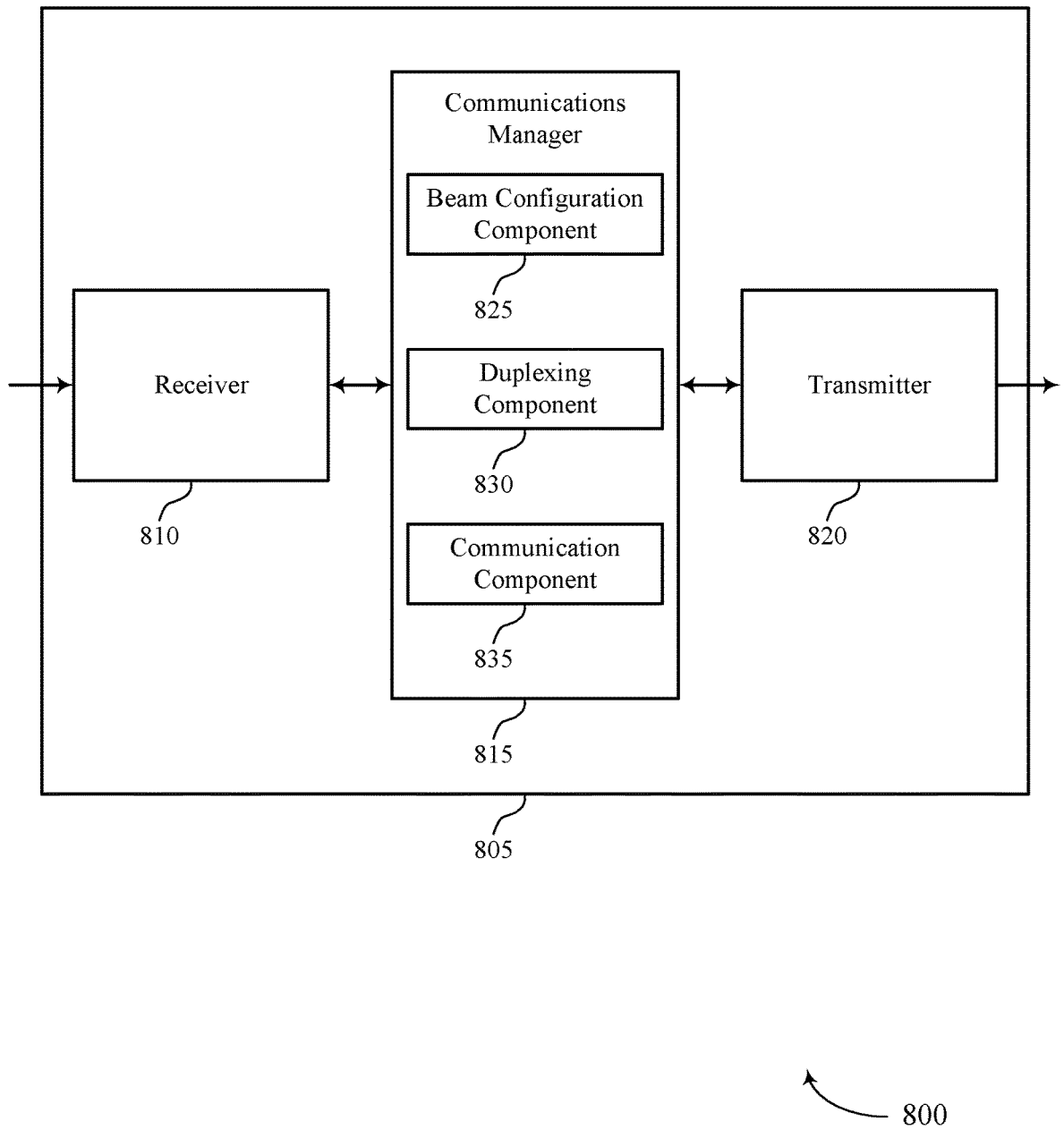

FIG. 8 shows a block diagram 800 of a wireless device 805 that supports duplexing modes based on beam configurations for wireless communications in accordance with aspects of the present disclosure. Wireless device 805 may be an example of aspects of a wireless device 705 or a UE 115 or base station 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to duplexing modes based on beam configurations for wireless communications, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include beam configuration component 825, duplexing component 830, and communication component 835.

Beam configuration component 825 may identify a set of beam configurations for a set of communications with at least one target device. In some cases, the set of beam configurations is identified based at least in part on the identified signal type or channel type.

Duplexing component 830 may determine a duplexing mode for the set of communications based on the identified set of beam configurations or on the identified signal type or channel type. In some cases, the duplexing mode is determined based on a level of traffic demand, capabilities associated with one or more devices, limitations associated with one or more devices, received measurement reports of one or more reference signals, or a combination thereof. In some examples, the one or more reference signals include at least one of a synchronization signal, a beam reference signal, or a combination thereof. In some instances, determining the duplexing mode includes: receiving an indication of the duplexing mode for the set of communications. In some cases, the duplexing mode is selected by a control node. In some aspects, the control node includes at least one of a central node, a scheduling device of the wireless device, the at least one target device, or any combination thereof. In some cases, the duplexing mode includes at least one of a full duplex mode, half-duplex mode, SU-MIMO mode, MU-MIMO mode, or a combination thereof.

Communication component 835 may communicate with the at least one target device based on the identified set of beam configurations and the determined duplexing mode.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
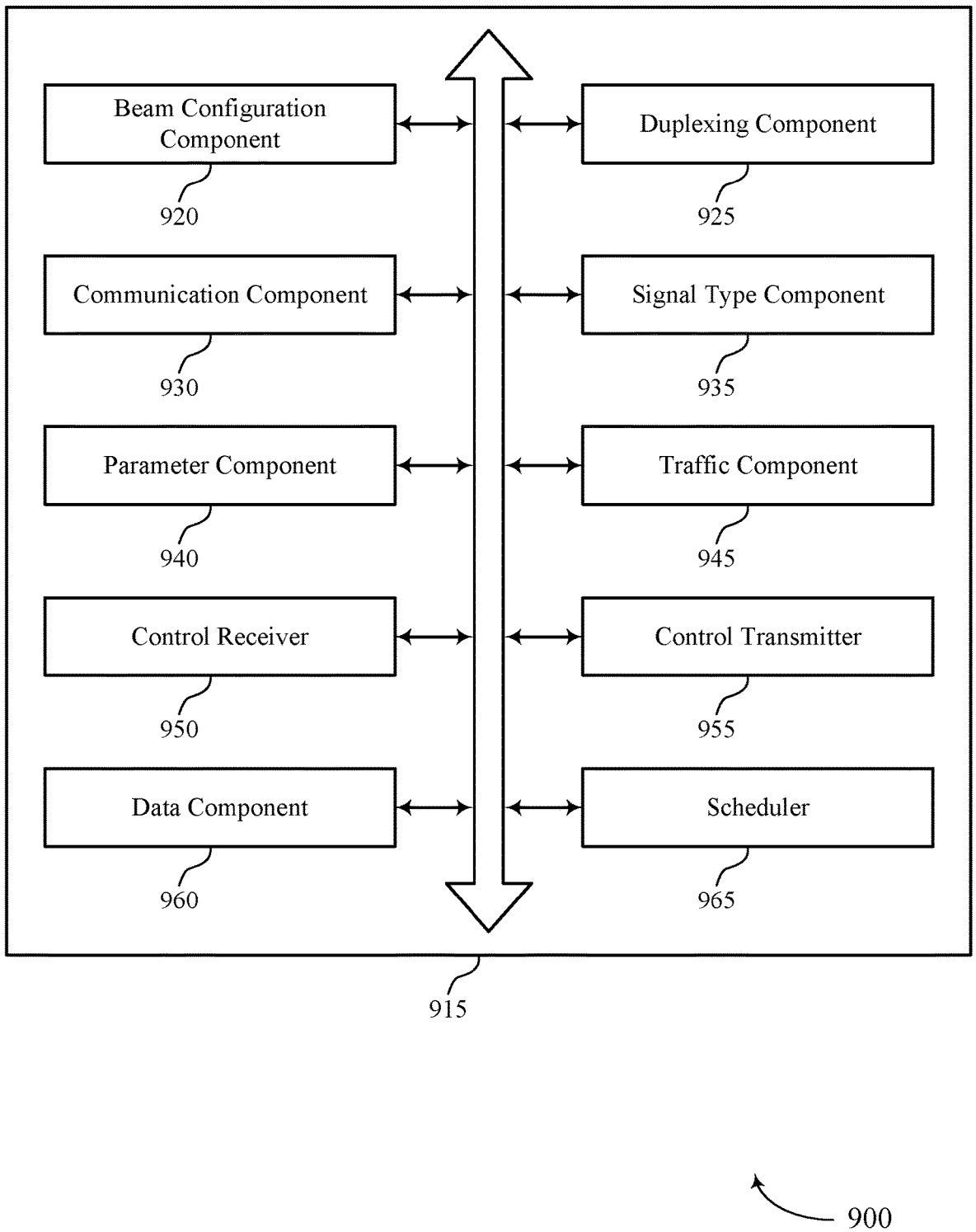

FIG. 9 shows a block diagram 900 of a communications manager 915 that supports duplexing modes based on beam configurations for wireless communications in accordance with aspects of the present disclosure. The communications manager 915 may be an example of aspects of a communications manager 715, a communications manager 815, or a communications manager 1015 described with reference to FIGS. 7, 8, and 10. The communications manager 915 may include beam configuration component 920, duplexing component 925, communication component 930, signal type component 935, parameter component 940, traffic component 945, control receiver 950, control transmitter 955, data component 960, and scheduler 965. Each of these modules may communicate, directly or indirectly, with one another (e.g., via one or more buses).

Beam configuration component 920 may identify a set of beam configurations for a set of communications with at least one target device.

Duplexing component 925 may determine a duplexing mode for the set of communications based on the identified set of beam configurations or on the identified signal type or channel type. In some cases, the duplexing mode is determined based on a level of traffic demand, capabilities associated with one or more devices, limitations associated with one or more devices, received measurement reports of one or more reference signals, or a combination thereof. In some examples, the one or more reference signals include at least one of a synchronization signal, a beam reference signal, or a combination thereof. In some instances, determining the duplexing mode includes: receiving an indication of the duplexing mode for the set of communications. In some cases, the duplexing mode is selected by a control node. In some aspects, the control node includes at least one of a central node, a scheduling device of the wireless device, the at least one target device, or any combination thereof. In some cases, the duplexing mode includes at least one of a full duplex mode, half-duplex mode, SU-MIMO mode, MU-MIMO mode, or a combination thereof.

Communication component 930 may communicate with the at least one target device based on the identified set of beam configurations and the determined duplexing mode.

Signal type component 935 may identify a signal type or channel type associated with the set of communications, where the set of beam configurations is identified based on the identified signal type or channel type.

Parameter component 940 may identify one or more parameters associated with a capability of the wireless device or with a capability of the at least one target device, where the set of beam configurations, the signal type, or the channel type is identified based on the identified one or more parameters and identify one or more parameters associated with one or more wireless communication links between the wireless device and the at least one target device, where the set of beam configurations, the signal type, or the channel type is identified based on the identified one or more parameters. In some cases, the one or more parameters include path loss associated with the one or more wireless communication links, directionality associated with the one or more wireless communication links, or a combination thereof.

Traffic component 945 may identify a level of traffic demand of the wireless device, the at least one target device, or an additional device, where the set of beam configurations, the signal type, or the channel type is identified based on the identified level of traffic demand.

Control receiver 950 may receive a first control channel in a first slot of a subframe according to a first duplexing mode.

Control transmitter 955 may transmit a second control channel in a second slot of the subframe according to the first duplexing mode. In some cases, the first duplexing mode includes a half-duplex mode.

Data component 960 may communicate one or more data channels in a third slot of the subframe according to a second duplexing mode different from the first duplexing mode and include a time gap between the first control channel, the second control channel, the one or more data channels, or a combination thereof. In some cases, the second duplexing mode includes a full duplex mode.

Scheduler 965 may communicate a first scheduling message to the at least one target device in a first portion of a control block of a slot and communicate a second scheduling message to the at least one target device in a second portion of the control block of the slot. In some cases, the first scheduling message indicates a data channel transmission for the at least one target device. In some cases, the second scheduling message indicates a data channel reception for the at least one target device. In some cases, the control block is multiplexed according to a TDM scheme, an FDM scheme, a code division multiplexing (CDM) scheme, a spatial division multiplexing (SDM) scheme, or a combination thereof. In some cases, the first scheduling message or the second scheduling message is based on a traffic demand for one or more nodes, a capability of the at least one target device, a signal type associated with the first scheduling message or the second scheduling message, an indication from one or more scheduling nodes, or a combination thereof.

Figure 10:
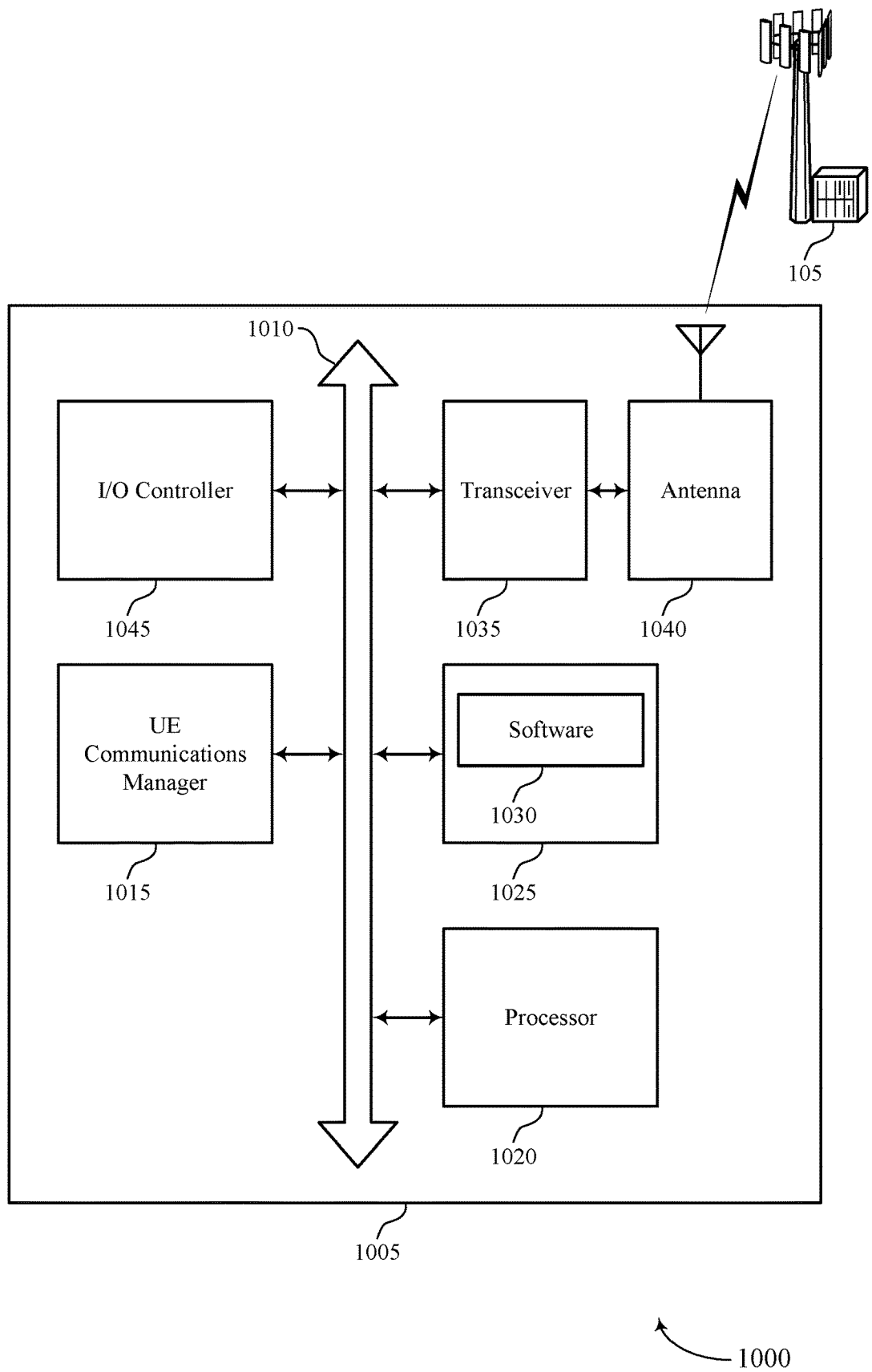
FIG. 10 illustrates a block diagram of a system including a user equipment (UE) that supports duplexing modes based on beam configurations for wireless communications in accordance with aspects of the present disclosure.

FIG. 10 shows a diagram of a system 1000 including a device 1005 that supports duplexing modes based on beam configurations for wireless communications in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting duplexing modes based on beam configurations for wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support duplexing modes based on beam configurations for wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
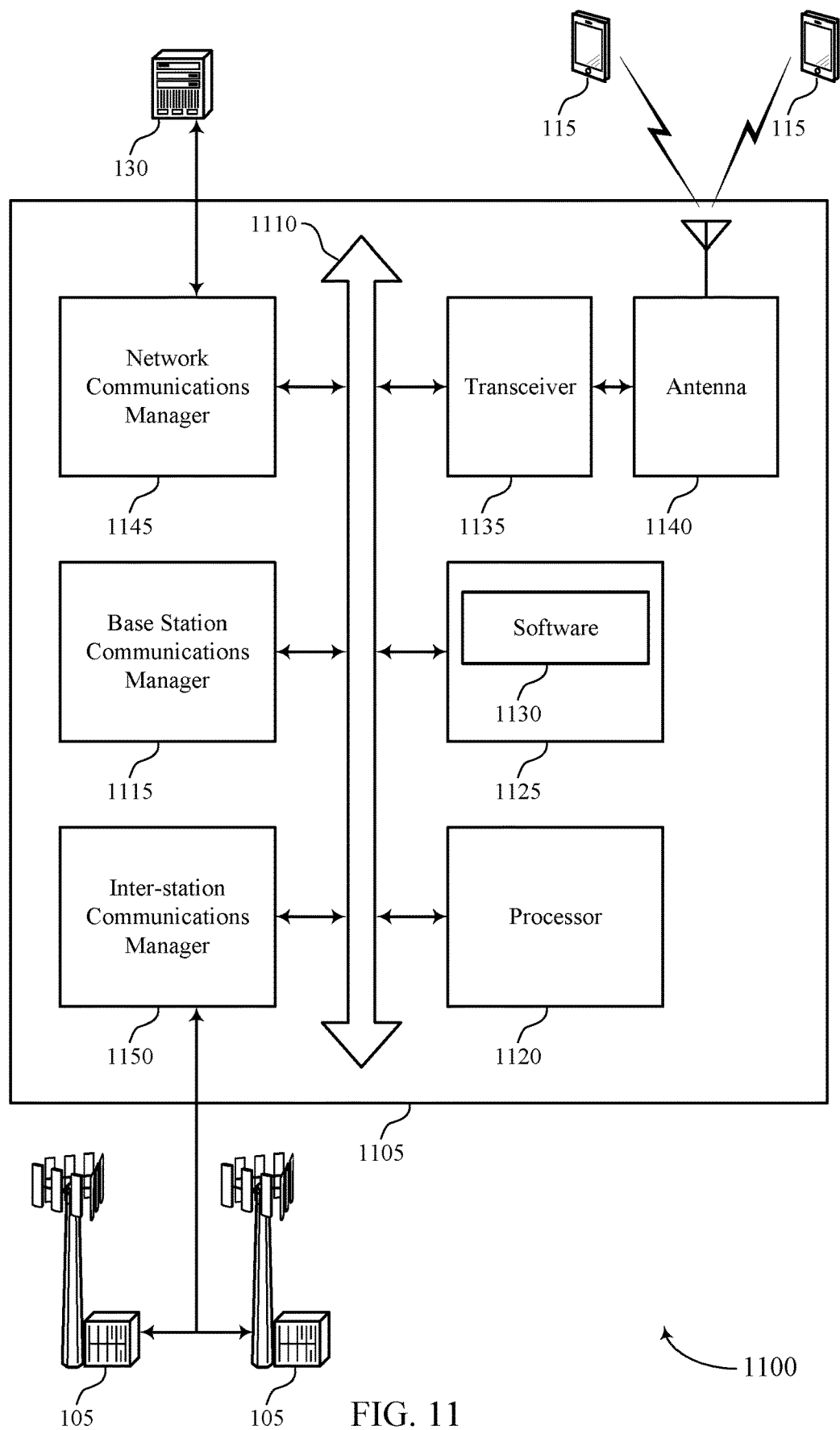
FIG. 11 illustrates a block diagram of a system including a base station that supports duplexing modes based on beam configurations for wireless communications in accordance with aspects of the present disclosure.

FIG. 11 shows a diagram of a system 1100 including a device 1105 that supports duplexing modes based on beam configurations for wireless communications in accordance with aspects of the present disclosure. Device 1105 may be an example of or include the components of wireless device 805, wireless device 905, or a base station 105 as described above, e.g., with reference to FIGS. 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting duplexing modes based on beam configurations for wireless communications).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support duplexing modes based on beam configurations for wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
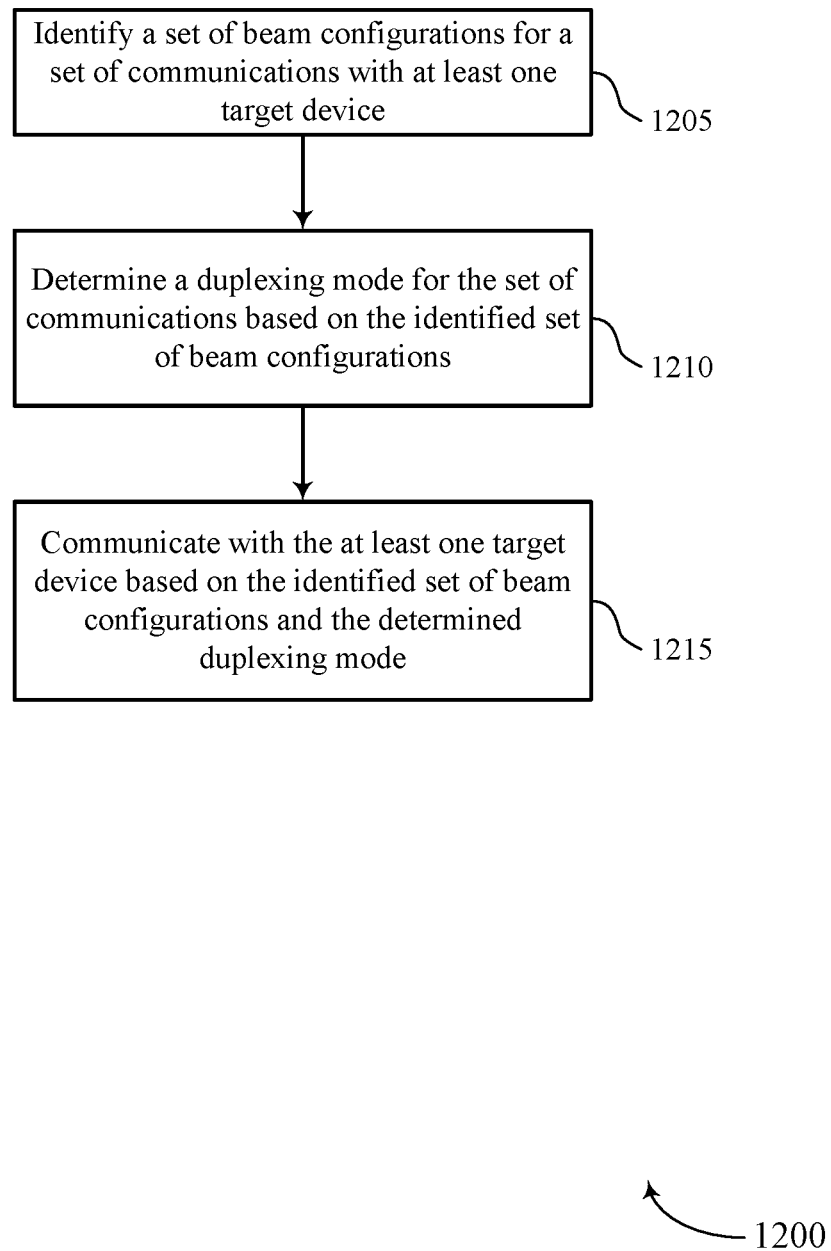
FIG. 12 illustrates a method for duplexing modes based on beam configurations for wireless communications in accordance with aspects of the present disclosure.

FIG. 12 shows a flowchart illustrating a method 1200 for duplexing modes based on beam configurations for wireless communications in accordance with aspects of the present disclosure. The operations of method 1200 may be implemented by a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may identify a set of beam configurations for a plurality of communications with at least one target device. The operations of 1205 may be performed according to the methods described herein. In certain examples, aspects of the operations of 1205 may be performed by a beam configuration component as described with reference to FIGS. 7 through 9.

At 1210 the UE 115 or base station 105 may determine a duplexing mode for the plurality of communications based on the identified set of beam configurations or the identified signal type or channel type. The operations of 1210 may be performed according to the methods described herein. In certain examples, aspects of the operations of 1210 may be performed by a duplexing component as described with reference to FIGS. 7 through 9.

At 1215 the UE 115 or base station 105 may communicate with the at least one target device based on the identified set of beam configurations and the determined duplexing mode. The operations of 1215 may be performed according to the methods described herein. In certain examples, aspects of the operations of 1215 may be performed by a communication component as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may contain RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   identifying a set of beam configurations for a plurality of communications with at least one target device;

determining, from a set of duplexing modes for the wireless device, a duplexing mode for the wireless device to use for the plurality of communications, wherein the duplexing mode is determined based at least in part on the identified set of beam configurations; and communicating with the at least one target device based at least in part on the identified set of beam configurations and the determined duplexing mode.

2. The method of claim 1, further comprising:
identifying a signal type or channel type associated with the plurality of communications, wherein the set of beam configurations is identified based at least in part on the identified signal type or channel type.

3. The method of claim 1, further comprising:
identifying one or more parameters associated with a capability of the wireless device or with a capability of the at least one target device, wherein the set of beam configurations is identified based at least in part on the identified one or more parameters.

4. The method of claim 1, further comprising:
identifying a level of traffic demand of the wireless device, the at least one target device, or an additional device, wherein the set of beam configurations is identified based at least in part on the identified level of traffic demand.

5. The method of claim 1, further comprising:
identifying one or more parameters associated with one or more wireless communication links between the wireless device and the at least one target device, wherein the set of beam configurations is identified based at least in part on the identified one or more parameters.

6. The method of claim 5, wherein the one or more parameters comprise path loss associated with the one or more wireless communication links, directionality associated with the one or more wireless communication links, or a combination thereof.

7. The method of claim 1, wherein the duplexing mode is determined based at least in part on a level of traffic demand, capabilities associated with one or more devices, limitations associated with the one or more devices, received measurement reports of one or more reference signals, or a combination thereof.

8. The method of claim 7, wherein the one or more reference signals comprise at least one of a synchronization signal, a beam reference signal, or a combination thereof.

9. The method of claim 1, wherein determining the duplexing mode from the set of duplexing modes for the wireless device comprises:
receiving an indication of the duplexing mode for the wireless device to use for the plurality of communications.

10. The method of claim 1, further comprising:
transmitting an indication of the duplexing mode for the wireless device to use for the plurality of communications.

11. The method of claim 1, further comprising:
receiving a first channel in a first slot of a subframe according to a first duplexing mode; and
transmitting a second channel in a second slot of the subframe according to the first duplexing mode.

12. The method of claim 11, wherein the first duplexing mode comprises a half-duplex mode.

13. The method of claim 11, further comprising:
communicating one or more channels in a third slot of the subframe according to a second duplexing mode different from the first duplexing mode.

14. The method of claim 13, wherein the second duplexing mode comprises a full duplex mode.

15. The method of claim 13, further comprising:
including a time gap between a first control channel, a second control channel, one or more data channels, or a combination thereof.

16. The method of claim 1, further comprising:
communicating a first scheduling message to the at least one target device in a first portion of a control block of a slot; and
communicating a second scheduling message to the at least one target device in a second portion of the control block of the slot.

17. The method of claim 16, wherein:
the first scheduling message indicates a data channel transmission for the at least one target device; and
the second scheduling message indicates a data channel reception for the at least one target device.

18. The method of claim 16, wherein the first scheduling message or the second scheduling message is based at least in part on a traffic demand for one or more nodes, a capability of the at least one target device, a signal type associated with the first scheduling message or the second scheduling message, an indication from one or more scheduling nodes, or a combination thereof.

19. The method of claim 1, wherein determining the duplexing mode comprises selecting the duplexing mode from the set of duplexing modes for the wireless device, wherein the set of duplexing modes comprise at least one of a full duplex mode, half-duplex mode, single user (SU) multiple input multiple output (MIMO) (SU-MIMO) mode, multiple user (MU) MIMO mode, or a combination thereof.

20. A method for wireless communication at a wireless device, comprising:
identifying a signal type or channel type for a plurality of communications with at least one target device;
determining, from a set of duplexing modes for the wireless device, a duplexing mode for the wireless device to use for the plurality of communications, wherein the duplexing mode is determined based at least in part on the identified signal type or channel type; and
communicating with the at least one target device based at least in part on the determined duplexing mode.

21. The method of claim 20, further comprising:
identifying a set of beam configurations associated with the plurality of communications based at least in part on the identified signal type or channel type.

22. The method of claim 20, further comprising:
identifying one or more parameters associated with a capability of the wireless device or with a capability of the at least one target device, wherein the signal type or channel type is identified based at least in part on the identified one or more parameters.

23. The method of claim 20, further comprising:
identifying a level of traffic demand of the wireless device, the at least one target device, or an additional device, wherein the signal type or channel type is identified based at least in part on the identified level of traffic demand.

24. The method of claim 20, further comprising:
identifying one or more parameters associated with one or more wireless communication links between the wireless device and the at least one target device, wherein the signal type or channel type is identified based at least in part on the identified one or more parameters.

25. The method of claim 24, wherein the one or more parameters comprise path loss associated with the one or more wireless communication links, directionality associated with the one or more wireless communication links, or a combination thereof.

26. The method of claim 20, wherein the duplexing mode is determined based at least in part on a level or traffic demand, capabilities associated with one or more devices, limitations associated with the one or more devices, received measurement reports of one or more reference signals, or a combination thereof.

27. The method of claim 26, wherein the one or more reference signals comprise at least one of a synchronization signal, a beam reference signal, or a combination thereof.

28. The method of claim 20, wherein determining the duplexing mode comprises:
  receiving an indication of the duplexing mode for the wireless device to use for the plurality of communications.

29. An apparatus for wireless communication, comprising:
  a processor;
  memory in electronic communication with the processor; and
  instructions stored in the memory and executable by the processor to cause the apparatus to:
    identify a set of beam configurations for a plurality of communications with at least one target device;
    determine, from a set of duplexing modes for a wireless device, a duplexing mode for the apparatus to use for the plurality of communications, wherein the duplexing mode is determined based at least in part on the identified set of beam configurations; and
    communicate with the at least one target device based at least in part on the identified set of beam configurations and the determined duplexing mode.

30. An apparatus for wireless communication, comprising:
  a processor;
  memory in electronic communication with the processor; and
  instructions stored in the memory and executable by the processor to cause the apparatus to:
    identify a signal type or channel type for a plurality of communications with at least one target device;
    determine, from a set of duplexing modes for a wireless device, a duplexing mode for the apparatus to use for the plurality of communications, wherein the duplexing mode is determined based at least in part on the identified signal type or channel type; and
    communicate with the at least one target device based at least in part on the determined duplexing mode.

* * * * *